No. 873,919. PATENTED DEC. 17, 1907.
W. S. ARNOLD.
PROTECTING SHIELD OR GUARD FOR PNEUMATIC TIRES.
APPLICATION FILED FEB. 18, 1907.
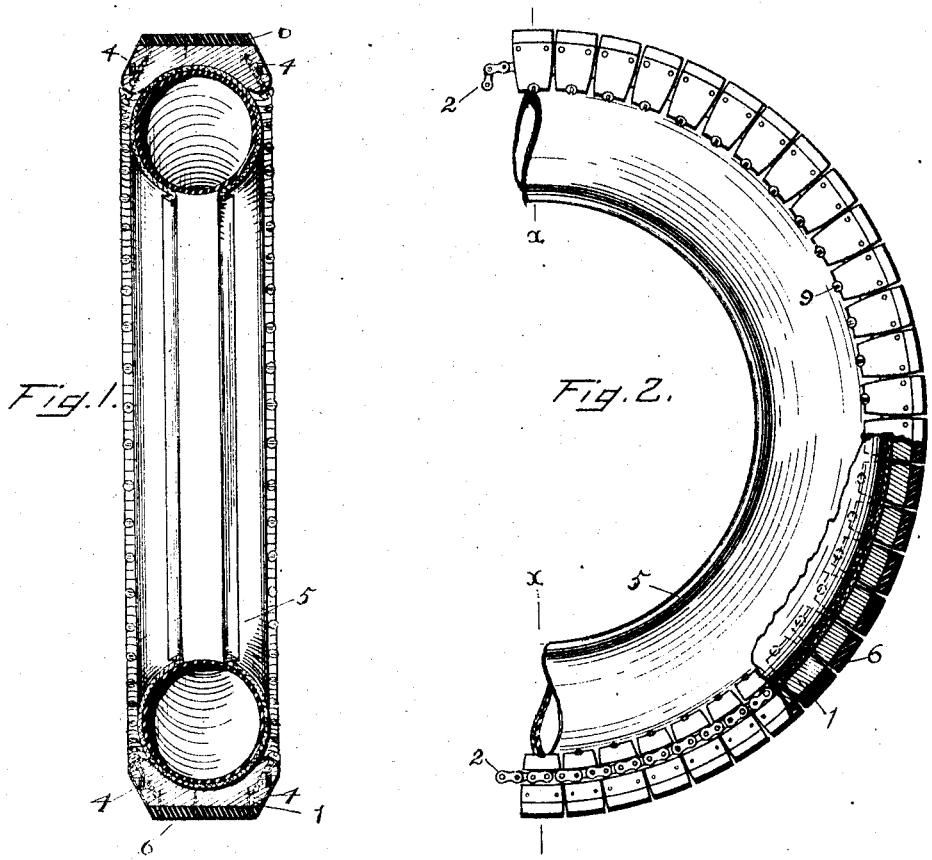
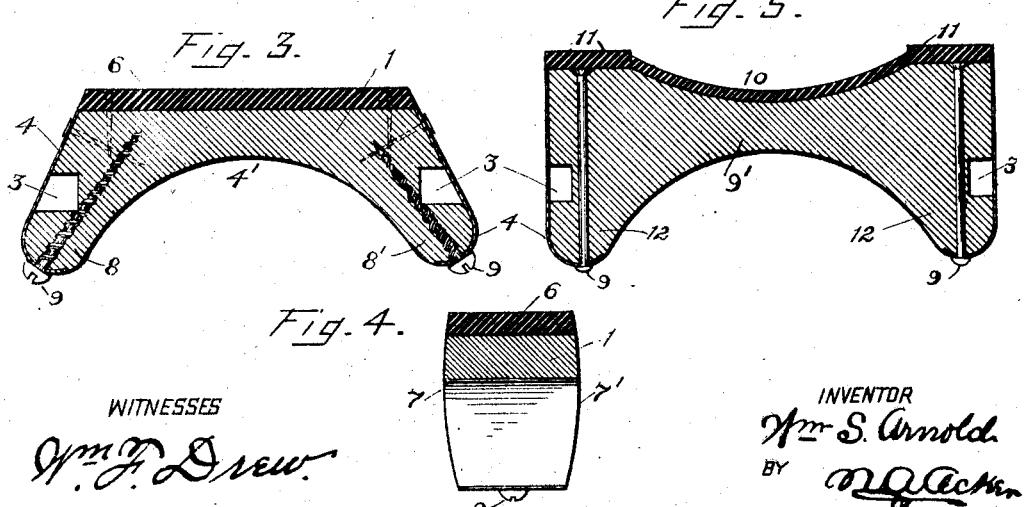
WITNESSES
Wm. F. Drew.
Wm. F. Booth.
INVENTOR
Wm. S. Arnold.
BY
ATTORNEY

UNITED STATES PATENT OFFICE.

WILLIAM S. ARNOLD, OF SAN FRANCISCO, CALIFORNIA.

PROTECTING SHIELD OR GUARD FOR PNEUMATIC TIRES.

No. 873,919.      Specification of Letters Patent.      Patented Dec. 17, 1907.

Application filed February 18, 1907. Serial No. 357,880.

*To all whom it may concern:*

Be it known that I, WILLIAM S. ARNOLD, a citizen of the United States, residing at the city and county of San Francisco and State of California, have invented certain new and useful Improvements in Protecting Shields or Guards for Pneumatic Tires, of which the following is a specification.

The present invention comprises a protecting shield or guard for automobile tires; the same consisting of a series of independent blocks or segments held together circumferentially by parallel linked chains, the construction of the blocks or segments being such that each has a movement independent of the adjacent blocks or segments; a flexible shield or guard being thus provided, the blocks or segments composing the same having free independent movement in all directions.

The object of the invention is to provide a shield or guard which will protect the pneumatic tires of an automobile against punctures and excessive wear, thereby materially prolonging the life of the tires; to prevent the skidding of the automobile while traveling over slippery or moist roadways; to maintain the pneumatic tires cool and well ventilated, thereby providing against blow-outs due to overheating of the air held within the tire.

To comprehend the invention reference should be had to the accompanying sheet of drawings, wherein—

Figure 1 is a vertical sectional view taken on line $x$—$x$ Fig. 2 of the drawings, the shield or guard being illustrated as applied to a pneumatic tire; Fig. 2 is a broken side view in elevation of the shield or guard and the tire to which the same is applied; Fig. 3 is an enlarged transverse sectional view of one of the blocks or segments composing the shield or guard; Fig. 4 is a sectional view in end elevation of one of the blocks or segments; and Fig. 5 is a view similar to that illustrated by Fig. 3 of the drawings, showing the construction of a block or segment to be used in the formation of a shield or guard for use in territory where the roadways are mainly of a sandy nature.

The shield or guard is composed of a series of blocks or segments 1, which are held together circumferentially by means of the parallel linked chains 2. These chain connections extend through longitudinal grooves or channels 3, formed in the ends of each block or segment 1. The outer ends of each block or segment are inclined inwardly toward the tread surface thereof, and such inclined or beveled ends are protected by the metal face plates 4. These face plates also serve as guards against the admission of mud and stones into the chain opening or grooves 3.

The blocks or segments 1 are preferably formed of wood, although the same may be constructed of aluminium, compressed fiber, or any other suitable material. However, preference is given to wood, owing to the cheapness thereof, its lightness, and the ease with which the same may be worked. The under face surface or the bearing face of each block or segment is cut away as shown at 4' to correspond to the contour of the tire 5 over which the same is to be fitted, so as to enable the block or segment to embrace the exposed surface of the said tire 5. In order that the wear of the blocks or segments may be provided against, each block or segment 1 has detachably secured to the outer face thereof a tread shoe 6, said shoe being preferably composed of compressed fiber. The faces 7—7' of the blocks or segments 1 are slightly curved from top to bottom, thus allowing each block or segment when held circumferentially to rock or oscillate independently of adjacent blocks so as to give circumferentially to the compression of the pneumatic tire, and to permit of the same yielding to inequalities of the roadway. A pivotal contact is thus made between the surfaces of adjacent blocks, which permits of free and independent movement of the blocks or segments. Owing to the beveled or inwardly incline of the outer ends of the blocks or segments 1, each will give laterally to obstructions encountered in the roadway.

By the use of the described shield or guard a free circulation of air is maintained for the pneumatic tire 5, giving perfect ventilation thereto, resulting in the tire being kept cool at all times, preventing the overheating of the air held therein and obviating danger of a blow-out.

Inasmuch as each block or segment 1 is free of locked engagement with adjacent blocks or segments, all the blocks or segments being held circumferentially in position by linked chain connections, each block or segment is permitted free movement in any direction independent of such movement as may be given adjacent blocks or segments. To overcome the tendency of the embracing portions 8—8' of the blocks or segments splitting, when the blocks or segments are formed of wood, a strengthening screw, rivet or bolt 9 is fitted within such portions of the blocks or segments, the same extending well into the body portion thereof, as shown in Figs. 4 and 5 of the drawings.

The block or segment 9' disclosed by Fig. 5 of the drawings, is mainly designed for the construction of a shield or guard to be used for travel in territory having roadways mainly formed of sand. For such travel it is deemed best that the upper surface of each block or segment be cut away centrally, so as to give a concave central portion 10. The flattened tread portions at each extremity of the central cut away portion 10 are protected by the detachable shoes 11. Instead of inclining or beveling the outer ends of the embracing portions 12 of the block or segment 9', the same are formed straight, but otherwise the construction of the said block or segment 9' is the same as that previously described. The tendency of a shield or guard composed of blocks or segments 9', that is having a central cut away portion 10, is to compress the sandy or loose soil within the depressed portion of the blocks or segments, thereby producing a compact support for the wheel, preventing its sinking deeply into the roadbed.

In the construction of the improved shield or guard, a sufficient number of the blocks or segments 1 are strung on the linked parallel chain connections 2 to form a shield or guard which, when the linked chains are united in the usual manner, will be of a diameter slightly greater than that of the tire 5 when deflated. The flexible shield or guard thus formed is slipped over the deflated tire, after which the tire is inflated, and the shield or guard held thereto by the expansion of the tire. As the tread section or shoe 6 of the blocks or segments become worn, the same are removed and replaced by new shoes. By the employment of the detachable tread shoes, injury to the blocks or segments composing the shield or guard by wear is obviated, as the said blocks or segments are not brought into direct contact with the surface of the roadbed. While the under surfaces or faces of the blocks or segments appear semicircular in form, it is obvious that the shape given thereto will be such as to conform substantially to the contour of the tire to be embraced. By reason of the close connection made between the blocks or segments composing the shield or guard, nails and other puncturing articles are excluded from engagement with the rubber tire protected by the shield or guard.

Having thus described the invention, what is claimed as new and desired to be protected by Letters Patent is—

1. A flexible shield or guard for the protecting of pneumatic tires, the same comprising a series of independently movable segments shaped to embrace the tire to be protected, a tread shoe detachably united to the outer surface of each segment, and linked parallel chains on which the segments are strung and held circumferentially.

2. A flexible shield or guard for pneumatic tires, the same comprising a series of independently movable segments, each segment having its under surface cut away to conform substantially to the contour of the tire to be embraced thereby, a groove or channel in the outer end faces of the embracing portion of each segment composing the shield or guard, linked chains extending through the said grooves or channels to hold the series of segments circumferentially, and end plates for each segment to protect the grooves or channels and the end walls of the said segments.

3. A flexible shield or guard for pneumatic tires, the same comprising a series of independently movable segments shaped to conform to the contour of the tire to be embraced thereby, a groove or channel formed in the outer end faces of each of the said segments, linked chains extending through the said grooves or channels to hold the segments circumferentially, end plates for each segment to protect the said grooves or channels and the end walls of the segments, and strengthening means extended through the embracing portions of the segments to prevent the splitting thereof.

4. A flexible shield or guard for pneumatic tires, the same comprising a series of independently movable segments held circumferentially by parallel linked chains extended through each segment of the series of segments, the under face of each segment being shaped to conform substantially to the contour of the tire to be embraced by the shield or guard, the outer surfaces of the segments being curved from top to bottom to provide pivotal contact between adjacent segments, and a wear shoe detachably united to each segment.

In testimony whereof I have signed my name to this specification in the presence of two subscribing witnesses.

WILLIAM S. ARNOLD.

Witnesses:
N. A. ACKER,
FRANK H. AYERS.